United States Patent Office

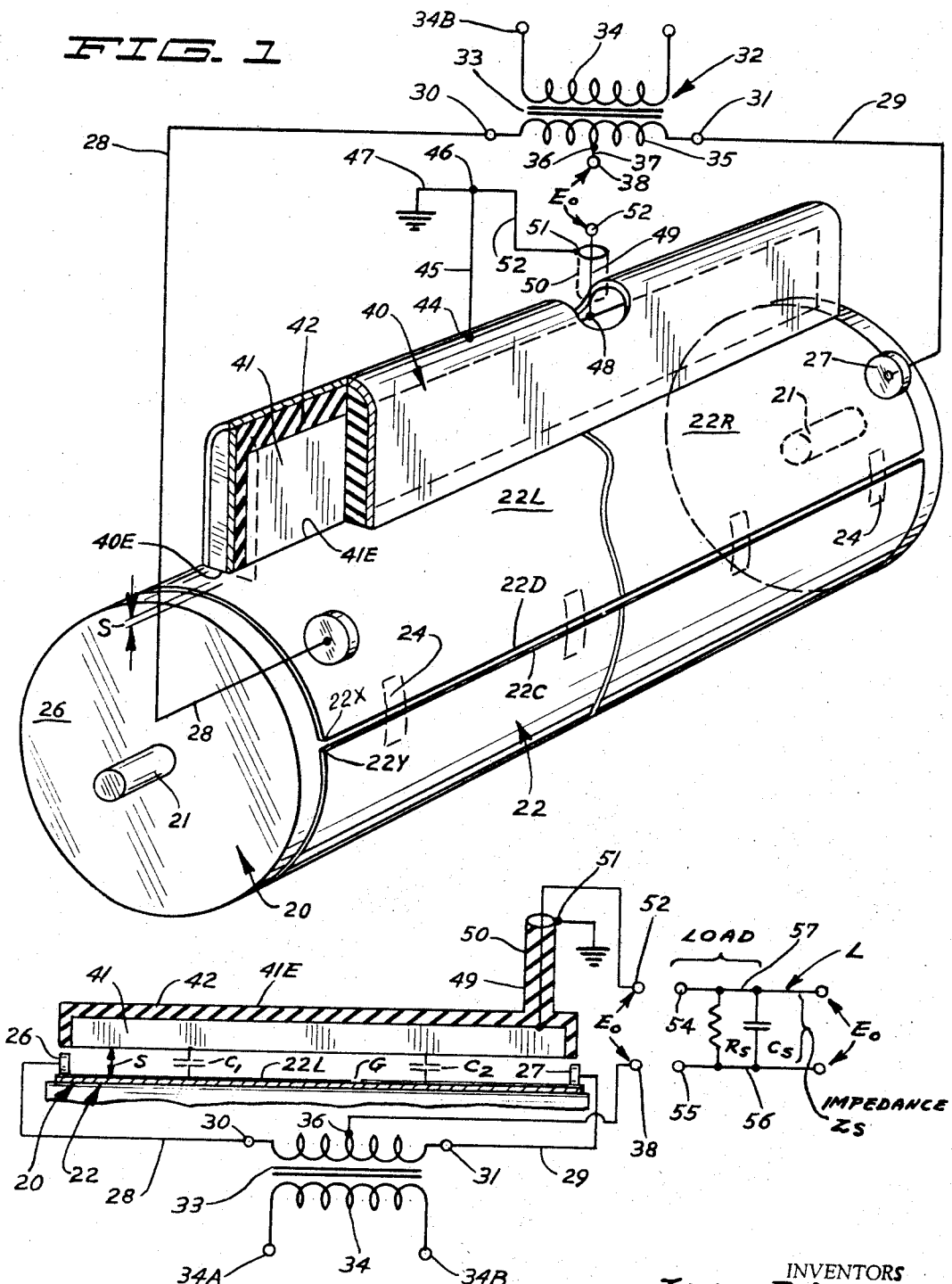

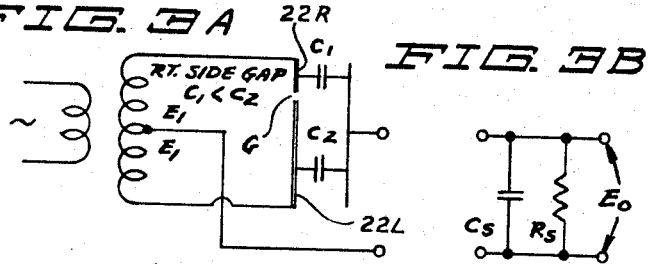
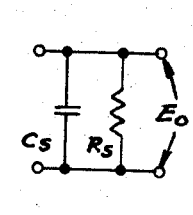
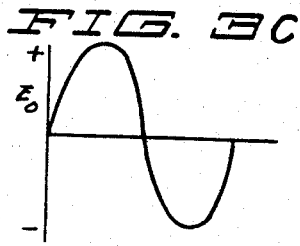
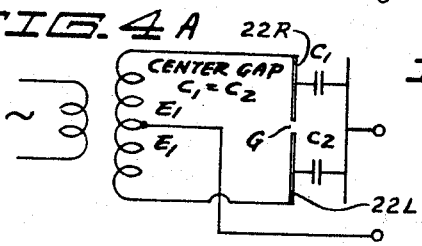
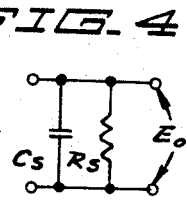
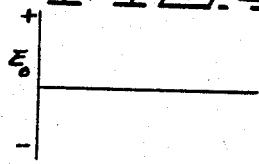
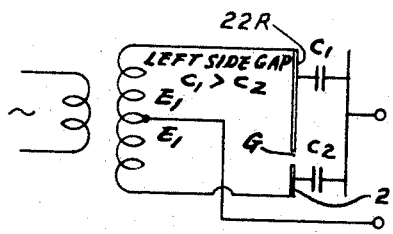
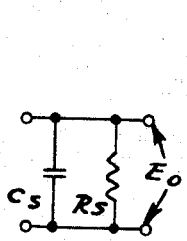
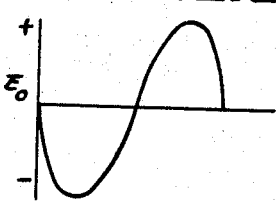
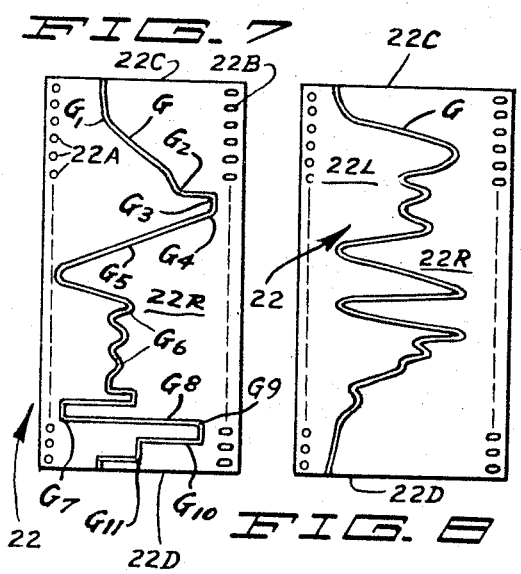
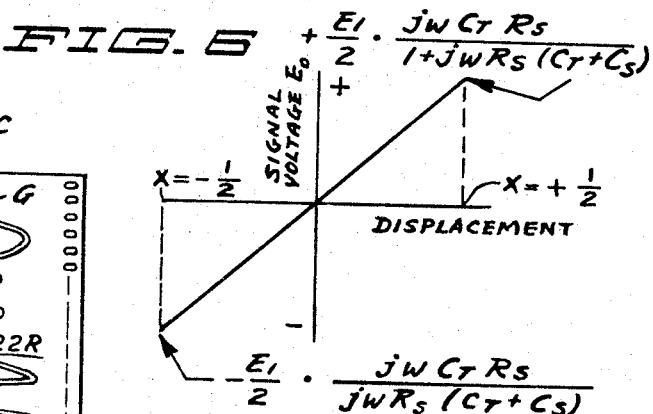
INVENTORS
JAMES R. ANDERSON
HERBERT J. WILDE
BY
Dugger Braddock Johnson + Westman
ATTORNEYS

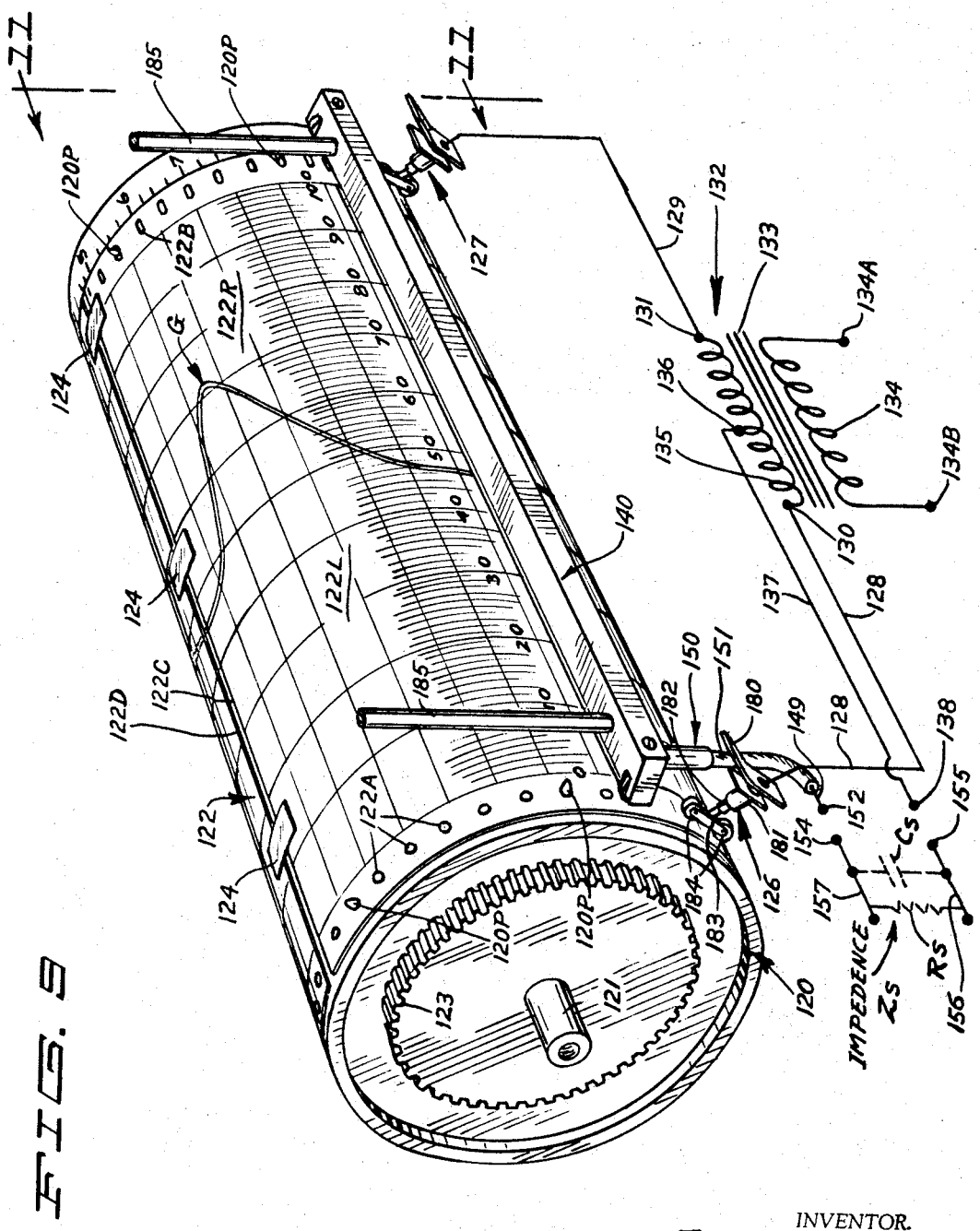

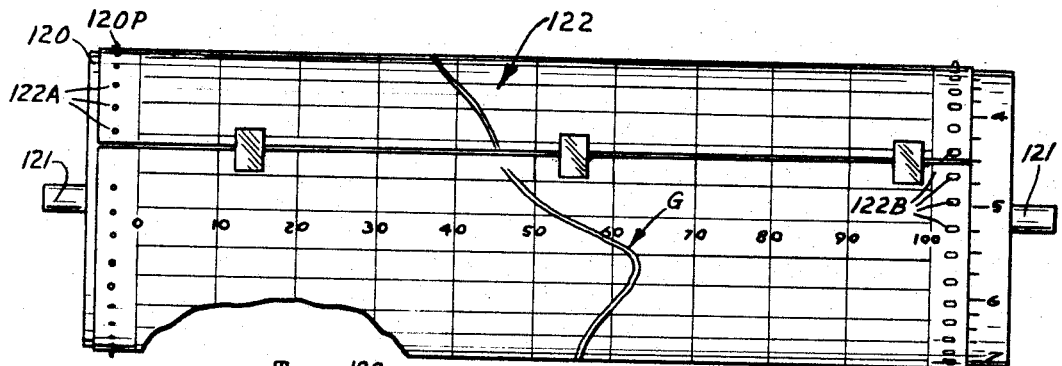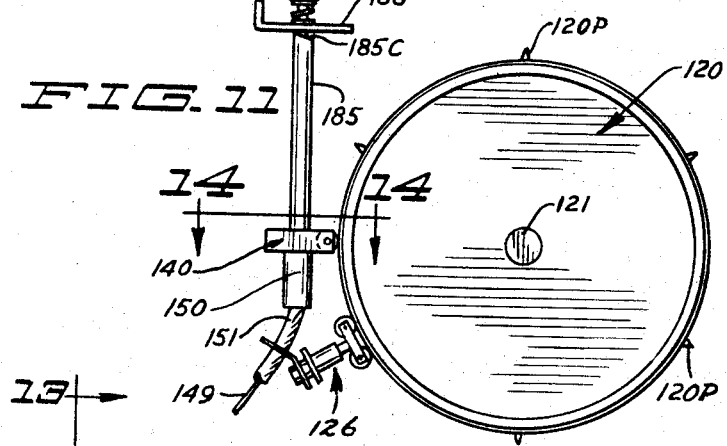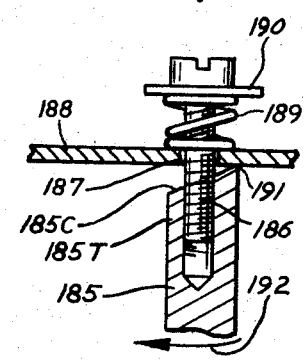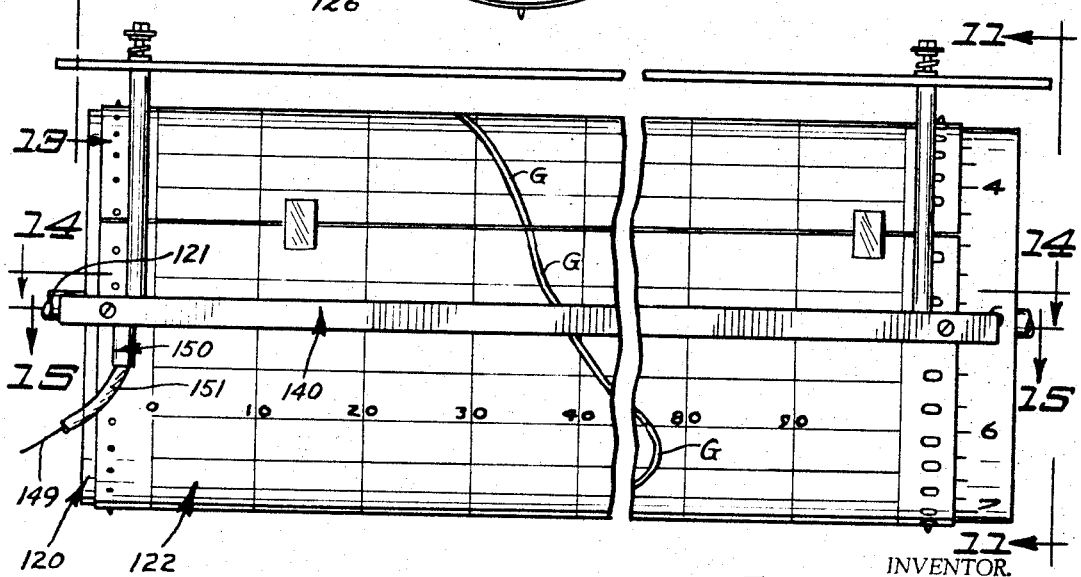

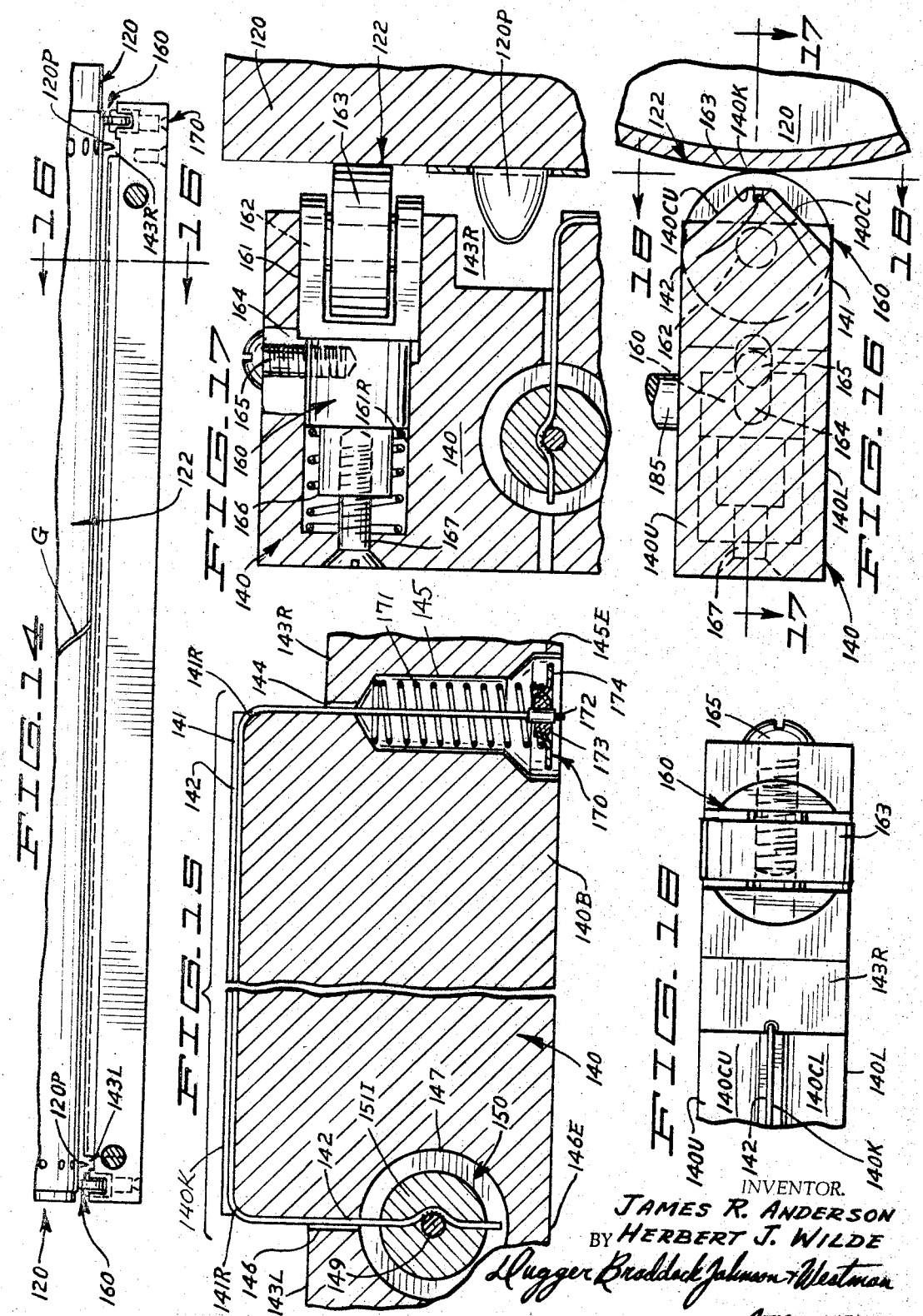

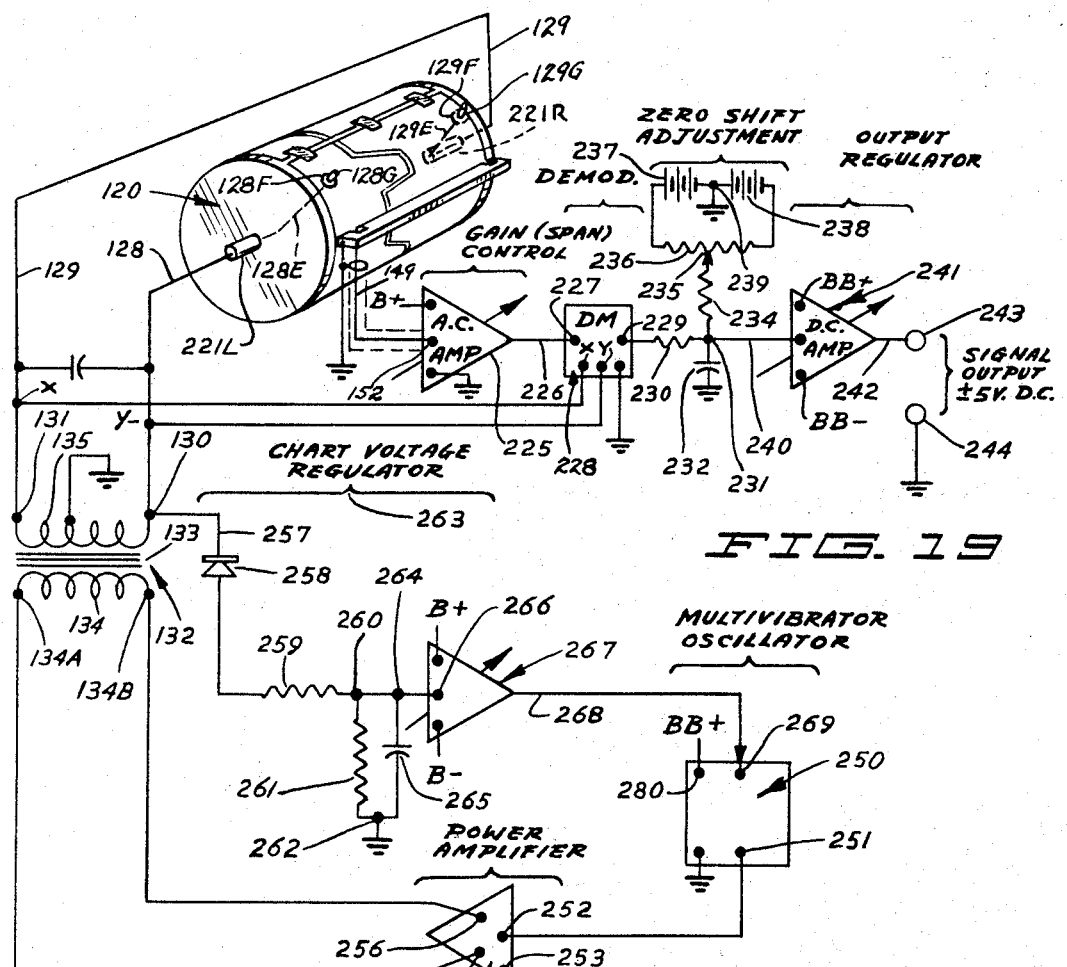

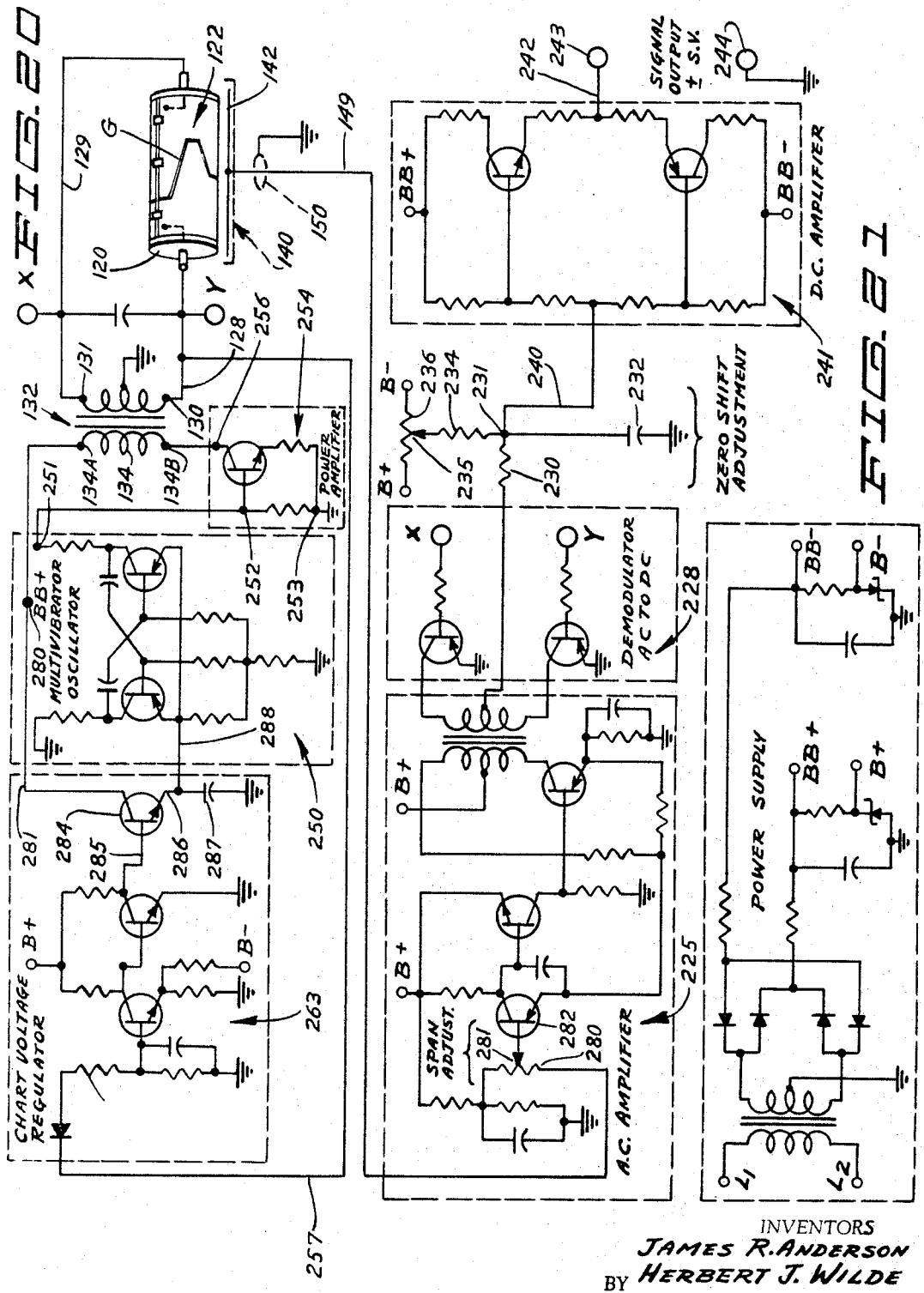

3,329,804
Patented July 4, 1967

3,329,804
FUNCTION GENERATOR
James R. Anderson and Herbert J. Wilde, St. Louis Park, Minn., assignors to Research, Incorporated, Minneapolis, Minn., a corporation of Minnesota
Filed July 22, 1963, Ser. No. 296,808
32 Claims. (Cl. 235—61.6)

This invention relates to a function generator and more particularly to a method and apparatus for generating an electrical voltage signal which is proportional to one coordinate of a graph which may be on any desired shape and is drawn on a suitable chart. In many instances, it is desirable to have an electrical signal which is proportional to the values represented by points along an arbitrary curve or graph. The graph may be one that is drawn for the purpose of engineering experimentation, scientific research, etc., or may be a curve of any function which has been recorded on a graph. The shape and variety of these curves and graphs is practically endless. For many purposes it is desirable to provide an outgoing or work signal which is linearly proportional to the distance from a datum or base line, to points along the curve (or graph) measured along a transverse coordinate, of a system of coordinates.

According to this invention it has been discovered that the curve which it is desired to reproduce as an output signal, may be "drawn" on an electrically conductive sheet such as paper, having an electrically conductive coating which may be volatilized or otherwise removed to make the graph line. This separates the originally uniform conductive coating into two electrically conductive areas, one on each side of the graph line which is thus "drawn." Utilization of this discovery is made in the present invention. Other methods of producing electrically conductive areas on each side of a graph line can be utilized and will be described.

It is an object of the invention to provide method and apparatus for producing an electrical output signal proportional in linear relationship to the values along a graph line as measured from a base (or datum) coordinate. It is another object of the invention to provide method and apparatus for producing an electrical output signal wherein the modulation of such signal is proportional in linear relationship to the distance of a graph line from a base coordinate. It is a further object of the invention to provide method and apparatus for generating an electrical output signal which is proportional according to linear relationship, and in which the modulation of such signal is proportional to the distance by which a graph line is displaced from a base coordinate, and wherein the phase of the signal so generated may be used to the direction of displacement of the graph line from such base coordinate.

It is another object of the invention to provide method and apparatus for generating an electrical signal which is proportional to the displacement of a graph line from a base coordinate and in which the output signal is a substantially faithful reproduction of the shape of the curve, even though the curve is of the block variety having exceedingly sharp and angular changes in direction therein.

Other and further objects are those inherent in the invention herein illustrated, described and claimed and will be apparent as the description proceeds.

To the accomplishment of the foregoing and related ends, this invention then comprises the features herein fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is an isometric view, particularly in section, and partly schematic, illustrating the invention;

FIGURE 2 is a schematic diagram, illustrating the embodiment of the invention shown in FIGURE 1;

FIGURES 3A, 3B, 4A, 4B, 5A and 5B are related wiring diagrams illustrating the functioning of the apparatus of the present invention;

FIGURES 3C, 4C and 5C are graphs showing the electrical functions, as generated on the conditions of FIGURES 3A, 4A and 5A respectively;

FIGURE 6 is a graph illustrating the output signal provided by the invention;

FIGURES 7 and 8 are plan views of two graphs illustrating the variety of forms of graphs (curves) from which the signal may be reproduced utilizing the method and apparatus of the invention;

FIGURES 9 through 18 illustrate another and preferred embodiment of apparatus of the invention, and in which FIGURE 9 is an isometric view, partly schematic and similar to FIGURE 1, showing an apparatus of the invention and the wiring diagram therefor and of the load connected to it;

FIGURE 10 is a side elevational view showing the drum portion of the apparatus, removed from the remaining apparatus;

FIGURE 11 is an end elevational view of the apparatus, looking in the direction of arrows 11—11 of FIGURES 9 and 12;

FIGURE 12 is a front elevational view of the apparatus shown in FIGURE 9 except that the wiring diagram is not illustrated;

FIGURE 13 is a much enlarged fragmentary sectional view taken in the direction of arrows 13—13 of FIGURE 12;

FIGURE 14 is an enlarged fragmentary plan view, partly in section of the pick-up bar portion of the apparatus. This view is taken in the direction of arrows 14—14 of FIGURES 11 and 12;

FIGURE 15 is a greatly enlarged sectional view of the pick-up bar portion of the apparatus shown in FIGURE 12, FIGURE 15 being taken at the line and in the direction of arrows 15—15 of FIGURE 12. In FIGURE 15, the central portion of the pick-up bar is broken away to shorten the illustration, in view of the amount of enlargement in this view;

FIGURE 16 is a greatly enlarged vertical sectional view taken at the line and in the direction of arrows 16—16 of FIGURE 14;

FIGURE 17 is a greatly enlarged fragmentary horizontal sectional view taken along a line and in the direction of arrows 17—17 of FIGURE 16; and FIGURE 18 is a greatly enlarged fragmentary front elevational view of an end portion of the pick-up bar, taken at the line and in the direction of arrows 18—18 of FIGURE 16;

FIGURES 19–21 illustrate another embodiment of the invention, FIGURE 19 being a schematic view and block-type wiring diagram, FIGURE 20 being a full wiring diagram and FIGURE 21 the wiring diagram of a suitable power supply.

FIGURE 22 is an isometric view of another embodiment of the invention as applied to a polar-type graph.

FIGURE 23 is an isometric view of another embodiment of the invention as applied to a graph on a long strip of chart material and in which the chart is moved while the probe is held stationary.

Throughout the drawings, corresponding numerals refer to the same parts.

Referring to FIGURES 1–8, the embodiment of the apparatus of the invention, illustrated in FIGURES 1 and 2, particularly includes a drum generally designated 20 journalled on shafts 21—21, and driven by a suitable mechanism, not illustrated so that it revolves at a constant speed which may be slow or fast depending on how rapidly the function depicted upon the graph 22, which will be described, is to be repeatedly reproduced. The drum 20 is preferably constructed of electrically non-conducting material, but can be a metal drum, so long as it is insulated from the electrically conductive surfaces of the graph, which will now be described.

According to this invention, the graph 22 has the characteristic that its entire surface is conductive except for the graph line G, and the graph line G runs out from one end of the sheet to the other so as thereby to separate the conductive surface into two separate electrically-disconnected conductive areas, one on each side of the graph line G. There are many ways in which this kind of "graph" can be easily constructed. Thus a sheet of insulating base material (paper, plastic, etc.) may originally have bonded to it a thin layer of metal, and then coated with a resist except for the graph line G, and then etched to remove the metal of the line G, after which the resist can be removed. This, for example, would be the utilization of "printed circuit" techniques for making the graph. This is perfectly satisfactory but is somewhat more expensive and generally no more satisfactory from the standpoint of over-all results than the procedure now to be described.

The exemplary graphs shown in FIGURES 7 and 8, according to this invention can be made of paper which is initially provided with an electrically conductive coating, such as a thin coating of aluminum or other electrically conductive coatings which are readily removable may also be used. Where the paper is used on a drum, there are usually provided perforations on each edge so as to assist in registry of the paper with drive pins on the drum, as is the case in the embodiment of the invention shown in FIGURES 10–18. Thus the paper may be provided with a row of holes at 22A along one side and at 22B along the other side. The holes on one side are usually circular holes and those on the other side are frequently elongated holes, so as to assist in placing the paper on drums where there may be a little size variation in the axial spacing of the pins on the drum. It is noted, however, that in respect to FIGURE 1, the perforations are not needed or used and the paper is merely placed around the drum and held in place with adhesive tape. Objective is to cut the graph paper so that it will, as closely as possible, just encircle the drum. It is desirable to have the edges 22C and 22D meet in a butt joint, as nearly as possible. It is noted, parenthetically, that in FIGURE 1 and elsewhere throughout the drawings a little space is shown between the ends of the chart when on the drum. Thus note the space between 22C and 22D, of FIGURE 1, between 122C and 122D in FIGURE 9, etc. This space is shown somewhat exaggerated in the drawings. It is desirable that it be as little as possible. Before placing the paper on the drum, the graph line G which can be of any shape desired so long as it progresses constantly from one end towards the other end of the graph, is drawn upon the paper.

The most convenient form of graph paper that we have used for our invention is aluminum coated paper. This is a standard article of commerce. With such paper, the graph line G can be drawn very easily by using a heated stylus much like the stylus of a wood burning set. The stylus can be a blunt rounded point, and when heated and drawn along the coating, it will evaporate the aluminum coating from such aluminum coated paper. By drawing the heated stylus along the paper, the aluminum coating is evaporated away in a "line" and as a result, a narrow graph which is sufficiently (electrically) non-conductive for our purposes will be produced. Across the width of this graph line G (which in FIGURES 7 and 8 is depicted by parallel lines close together), the aluminum coating is absent and accordingly, the total face of the graph paper is thereby divided into two areas 22R and 22L which are electrically disconnected from each other. Therefore, when a potential is supplied to these two areas, a voltage will be impressed across the width of the graph line G, which is non-conductive, and hence the voltage differential applied to the two areas is maintained.

Other forms of electrically conductive paper may be used, and it is entirely feasible, though somewhat more time-consuming to make the "graph" from a thin sheet of metal which is cut apart, removing a narrow strip of the sheet metal corresponding to the graph line G. The remaining separated portions of the sheet are then placed on an insulating drum 20 in position so that their edges are close together but always spaced apart from each other sufficiently so as to depict the graph line and the pieces are held in place by adhesive tape. While this can be done, it is less convenient than using the metal coated paper hereinbefore mentioned, and therefore, for convenience and low cost, the technique of making the graph by evaporating the graph line G from metal coated paper, is much preferred.

The insulating paper which forms the base (or back) of the graph paper permits the use of a metal drum, since the paper is insulation. The only requirement is that the metallized (or other electrically conductive) surface areas of the graph should not contact the metal of the drum. Hence a metal drum can be used or a metal drum covered with a thin shield of insulation. Of course, it is also possible to make the drum entirely of insulation.

It will be noted in FIGURE 7 that the graph line is depicted as composed of various curves, some portions of which are smooth curves, as at G1 and other portions such as at G2, G3, G4, G7, G9 and G11, the curve changes direction very abruptly. The curve may include straight sections as at G5, oscillating curves as at G6 and segments as at G8 wherein the curve is completely transverse to the long axis of the graph. Also, as shown in FIGURE 8, the curve may be some recorded curve for example, a wave function recorded from a sound track. So long as the curve always progresses in one direction (that is to say always progresses from one end to the other of the chart strip without doubling back), a signal can be reproduced according to the present invention. Of course, if a curve doubles back then the mathematical solution of the curve across the transverse coordinate would provide two or several "solutions" and the present invention is not adapted to reproduce such "overhanging" or "doubled-back" curve shapes.

The curve (or graph) has been drawn on the paper 22, provides the separated electrically conductive areas 22R and 22L. The length of the graph (from edge 22C to 22D) is wrapped around the cylinder 20, with the conductive surfaces outward, and oriented as to bring the ends 22C and 22D proximate, and then these ends are fastened together and to the drum by short strips 24 of pressure-sensitive cellulosic tape. This tape overlies the metallized surface, which is placed outwardly on the drum, and in the space 25, between the ends 22C and 22D the tape adheres to the drum, and thus "keys" the entire chart on the drum. It is desirable that the corners 22X and 22Y of the chart be brought square with each other (so that the chart is not placed on the drum spirally). While the graph lines G (in FIGURE 1 and FIGURES 7 and 8) are depicted as beginning at the same or substantially the same coordinate distance, as measured from one edge of the chart, this is not an essential requirement of the invention, since the invention provides for generation of the output signal according to the position of the graph line even though the position of the graph line coordinate may abruptly change, as from one end to the other of the segments G8 of graph line G in FIGURE 7. In other words, it is not essential that the chart start and end at the same coordinate.

With the chart in place on the drum, there is then provided means for conducting electric current to the metal or electrically conductive coating on the chart surface, which is spaced outwardly. In FIGURE 1 the connection is made by means of the rollers 26 and 27 which are connected via lines 28 and 29 respectively to the terminals 30 and 31 respectively of the secondary 35 of transformer generally designated 32. The transformer has a core 33 and a primary winding 34 that has terminals 34A and 34B, served by an alternating current power source. The secondary winding 35 which has the terminals 30 and 31, is also provided with a tap 36, which may be a center tap or any other proportional tap along the winding 35, as desired. This tap is connected via line 37 to the terminal 38 which is one of two signal output terminals.

Mounted adjacent the drum 20 by bracketing not illustrated in FIGURE 1, but which is illustrated with reference to FIGURES 10–18, there is provided a structure generally designated 40, which serves to mount a capacitative pickup strip 41. The structure 40 is in the shape of a U-shaped channel, closed at its ends and the strip 41 is positioned in the channel and is solidly held by a filling 42 of electrical insulation. The strip 41 has only one critical dimension, and that is the edge 41E. The edge 41E is exposed between the insulation, and between the separate proximate edges 40E—40E of the bar 40, which acts as an electrical shield. According to this invention, the edge 41E should be straight and reasonably narrow. While some deviation from straightness and narrowness can be tolerated, it is desirable that the edge be as straight as possible and quite narrow. The entire entity composed of the U-shaped channel 40, the insulation filling 42 and the strip 41 having its side edge (lower edge in FIGURE 1) exposed in the direction of the graph on drum 20, is mounted so that the edge 41E of the strip 41 is spaced very slightly from the metallized coating on the graph 22 that is mounted on the drum. This space is depicted by the dimension S. It is desirable that this dimension be kept quite small, as for example a few thousandths of an inch and of uniform dimension from one end to the other of strip 41. The U-shaped channel 40 has an electrical connection at 44 which is connected via line 45 to junction 46 which is in turn connected via line 47 to the ground GR. A connection 48 is also made on the strip 41 and this is connected to the line 49 which is the electrical leadwire in a shielded cable generally designated 50. As is well known, such shielded cable contains an insulated electrical conductor, here illustrated as the conductor 49 on its exterior there is provided an electrically conductive shield, here illustrated at 50. From the shield 50 a connection is made via terminal 51 and line 52 to junction 46 and thence to ground GR. The line 49 connects directly to the output terminal 52 which is the second of the two output terminals the other terminal being 38.

The output signal being thus appears as a voltage across the terminals 38 and 52.

The energizing potential applied to terminals 34A and 34B of the primary winding 34, is an alternating voltage source and it may have any frequency ranging from the low commercial frequencies such as 25, 50 or 60 cycles on up to the very high frequency, even in the radio frequency ranges. For many purposes a simple 60 cycle 110 volt alternating current source will suffice, but in other instances, especially where the graph G has a very abrupt change in direction as at corners G2, G3, G4, G7, G9 and G11 in FIGURE 7, it is desirable that the frequency be higher, for reasons which will become apparent later in this description.

Referring to FIGURE 2, there is illustrated in section a portion of the drum 20 upon which the graph paper 22, having the graph G thereon has been placed. In FIGURE 2, the thickness of the graph paper, the thickness of the metal areas 22R and 22L and the width of the graph line G, are all very much exaggerated. Actually this metallized coating forming areas 22R and 22L of the graph paper is only a few millionths of an inch thick, and the paper base is itself, only a few thousandths of an inch thick. Therefore, these thickness dimensions are tremendously exaggerated in FIGURE 2. Also in FIGURE 2, the space S between the edge 41E of the strip 41 and the metallized coating 22R and 22L on the graph paper 22 is greatly exaggerated. This dimension is in the order of magnitude of a few thousandths to say, thirty thousandths of an inch. In FIGURE 2, this gap space is shown much greater so as to permit illustration of the capacity symbols at C1 and C2.

In FIGURE 2 the load is illustrated at L and has terminals 54 and 55 which are connected via lines 56 and 57 to the load, which can be of any desired type. The load voltage is $E_0$. Regardless of the character of the load, it will have a certain impedance $Z_s$ composed of resistance $R_s$ and shunt capacity $C_s$. When terminals 52 and 54 are connected together and terminals 38 and 55 are connected together a circuit exists between line 57 through terminals 54–52 and line 49 is the pick-up strip 41. Likewise, when terminals 55 and 38 are connected together, a circuit exists via line 56 thence across these terminals and line 37 to the tap 36 on transformer winding 35 and thence through this winding via lines 28 and 29 and rolling connectors 26 and 27 respectively to the metallized surfaces 22R and 22L. The load L and everything connected to it represents a certain capacity $C_s$ between the lines 56 at 57, part of this capacity being attributable to the lines 48 and the strip 41 to ground. The portions of the capacity attributable to line 49 and strip 41 are not distinguishable from those portions of capacity within the load L itself, and these capacity effects are therefore lumped together as the capacity $C_s$, for purposes of analysis of the circuit. It will ba appreciated that the pictorial representation of resistance $R_s$ and capacity $C_s$ are therefore intended merely as representative of the resistance and capacitance between the lines 56 and 57, regardless of the particularities of location thereof.

The function line (graph G) divides the conductive surface (in this instance, the metallized surface) into two portions 22R and 22L. The total distributed capacitance between the pick-up electrode 41, and these metallized surfaces may, for purposes of analysis of operation, be considered as divided into two portions i.e. the capacitances indicated at C1 and C2 as shown in FIGURE 2 and FIGURES 3A, 4A and 5A. It will, of course, be appreciated that the capacity symbols C1 and C2 shown in the drawings, are not intended to signifiy separate discrete capacity devices, but are instead, intended to signify the capacity between the strip 41 (edge 41E) and the electrically conductive areas 22R and 22L respectively. These two capacities may be regarded as arms of a capacitative bridge. The bridge is energized by applying an alternating electrical voltage (from the transformer 32, via secondary winding 35) the voltage being applied via the rolling connectors 26 and 27 to the conductive planes 22L and 22R respectively. The output voltage of the capacitative bridge appears at terminals 38 and 52 and results from the unbalance of the two capacities C1 and C2. From another point of view, it may be considered that the output voltage results from the displacement of the function line G, with reference to an arbitrary zero position between the edges of graph 22. It is often convenient that this arbitrary reference position be midway between the side edges of the metallized surfaces of graph 22 but this is not essential according to the present invention and hence the zero (or reference) position may be shifted. This is accomplished by shifting the position of the tap 36 on the winding 35.

FIGURES 3A, 3B and 3C illustrate the functioning of the system when a center tap 36 is provided on transformer winding 35. With the potential E1, applied as shown in the drawings, either side of the center tap the output voltage of the capacitance bridge, when loaded into a load impedance $Z_s$ can be expressed as follows:

$$E_o = \frac{E_1 Z_s \cdot jw(C_1-C_2)}{1+Z_s \cdot jw(C_1+C_2)}$$

where $Z_s$ is composed of resistance $R_s$ and shunt capacity $C_s$

A more convenient form of this expression is $$E_o = \frac{E_1 \cdot jw C_T R_s 2}{1+jwR_s(C_T+C_s)} \cdot x$$

where $w$=frequency of $E_1$
$R_s$=load resistance
$C_s$=load capacitance
$C_T$=total capacitance of bridge, $C_T = C_1 + C_2$
$x$=unit displacement of function line from zero position With the center tap of the transformer provided as shown in FIGURE 2, the output function is illustrated by the series of FIGURES 3A through 6. Thus referring to FIGURE 6, it will be served that the output voltage $E_o$ varies as a straight line function.

FIGURES 3A, 3B and 3C illustrate the situation when the position of the graph line G has moved toward the right edge of the graph paper on the cylinder 20, as shown in FIGURES 1 and 2 (or "downward" in FIGURES 3A, 4A and 5A). When this occurs, the width dimension of strip 22R which is exposed to the edge 41E of strip 41, will decrease and the width dimension of portion 22L will correspondingly increase. Under these conditions, the capacitance C1 is correspondingly decreased whereas the capacitance C2 has become correspondingly increased. When this occurs the output signal $E_o$ is an alternating current voltage as shown in FIGURE 3C.

When the graph line G moves to a position in the center of the paper, in the direction of the transverse coordinate, the width of the conductive areas 22R and 22L are then equal, and the two capacitances C1 and C2 will also be equal, and under this condition, the output signal $E_o$ will be of zero value, as shown in FIGURES 4C.

As the graph line G moves to the left edge of the graph paper 22, the transverse coordinate width of 22L will decrease and 22R will increase and the value of the capacitance C1 will correspondingly increase and the value of the capacitance C2 will correspondingly decrease. Under these conditions the output signal $E_o$ will rise to a maximum voltage but the phase of the signal (i.e. the instantaneous polarity of the voltage) is opposite in FIGURE 5C as compared to when the graph line G is on the right end of the graph paper as in FIGURE 3C. This can be seen by comparison the phase of the output voltage, as illustrated in FIGURE 5C, wherein the first portion of the curve, designed "$E_o$" is negative, as compared to the phase of the signal shown in FIGURE 3C, where the first portion of the curve designated "$E_o$" is positive. Accordingly, it is a characteristic of the invention that when the graph line G passes the zero (or reference) position, at which time the capacitances C1 and C2 are such as to balance the bridge, the phase of the signal will shift from a positive phase as shown in FIGURE 3C to a negative phase as shown in FIGURE 5C. However, it must be remembered that the crest values (RMS values) of the voltage constituting the signal $E_o$, which appears at the output terminals 38 and 52 will depend upon the amount of displacement of the graph line G in either direction from the reference position in which the values of the two capacitances C1 and C2 is such as to balance the bridge circuit. In the embodiment of FIGURES 1, 2, 3A, 4A and 5A, the zero output signal is obtained by adjusting the voltage tap 36 on the transformer winding 35. By shifting this tap toward the terminal 30 or the terminal 31 the "zero point" can likewise be shifted. The voltage applied to terminal 38 can be any voltage between or outside the voltages appearing at terminals 30 and 31.

For every position of tap 36 on winding 35 there will be some position of the graph line G at which the bridge circuit balances and the voltage of the sequel $E_o$ is zero value. Also if winding 35 is extended, say beyond terminal 31, it is perfectly possible to place tap 36 on such extended portion of the winding and the zero value or datum position of the signal would thus be beyond one edge of the graph 22 and the signal $E_o$ would vary from the potential at tap 30, as one extreme, to the potential at tap 31, as the other extreme, but would never reach zero value.

Every time that the drum 20 revolves, the output signal will be repeated, and the output signal will vary in amplitude and direction, according to the shape of the graph line G, and the signal will bear a linear relationship to the displacement of the graph line from an arbitrarily selected zero coordinate. Every time the drum 20 revolves, the signal will be repeated cyclically, and the speed of rotation of the drum 20 may be made any speed convenient, so long as the graph paper 22 can be made to lie flat on the drum surface.

For best results, the graph paper should be free from wrinkles, indentations and surface irregularities, and the edge 41E of the pickup strip should be closed to the metallized surface of the graph paper and should be parallel to it so that the gap S between the edge and the metallized surface of the graph paper is uniform in width from one end to the other. Likewise, the edge 41E should be set parallel to the axis of rotation of the drum 20. From the standpoint of shielding, the entire strip 41 should be shielded on the sides and ends and for this purpose the U-shaped support channel is provided with closed ends so that the channel with its closed ends forms a shielded housing around the strip 41. Only the edge 41E of the strip is exposed and even it may be covered with a film of insulation, if desired. The edge 41E is in electrical capacity the relationship of the electrically conductive areas 22R and 22L of the graph paper 20, and depending on the closeness of the adjacent edges of the rounded channel 40, the edge 41E will, in effect "see" (electrically) a transverse strip across the graph 22. The width of this transverse strip which thus "seen" (or which is in electrical capacitative relation to edge 41E) depends on the width of the edge of strip 41, the closeness of the adjacent edges of channel 40, whether the edge 41E is recessed within the channel and the gap space S. For most situations it is preferred that the transverse strip of the graph "seen" (electrically) by the strip edge 41E should be a narrow width and this is normally achieved by keeping the edge of pick-up strip 41E narrow (or by making it "narrow" as in FIGURES 9–18); by keeping the support shielding close and by keeping the gap S of small dimension.

In FIGURES 9–18 there is illustrated the mechanism preferred embodiment of the invention, similar to that shown in FIGURE 1. FIGURES 19–21 are schematic diagrams showing the wiring for this embodiment of the invention. So far as practical, the numerals applied to the various component parts of the apparatus shown in these FIGURES 9–21 corresponds to those of the apparatus shown in FIGURE 1, except that they are one hundred digits higher. Thus referring to FIGURES 9–21, there is illustrated a drum 120 (corresponding to drum 20 of FIGURE 1), which is pivoted for rotation on the shaft 121. On the shaft 121 there is keyed a drive gear 123, which is arranged to be driven by drive motor, not illustrated as to rotate the drum 120 at a constant speed. The drive motor (not shown) is preferably made so that the speed of rotation of the drum may be adjusted as desired. In this instance the drum is provided with a plurality of pins 120P, so as to assist in registering the graph paper 122 thereon. The graph paper has a plurality of circular apertures 122A at the left edge and elongated apertures 122B at the opposite edge, similar to the graphs shown in FIGURES 7 and 8, so as to provide for any slight variation in spacings of the apertures. The graph paper 122 is preferably of the type having a thin metal coating on one face, which may be evaporated away so as to provide the graph line G, as hereinbefore described. The graph paper is cut off at a length suitable so that it will nearly encircle the drum and the graph line G is then drawn on by means of a heated stylus as previously described, and the paper is then placed on the drum and drawn snug and held in place by small pieces of pressure sensitive cellulosic tape 124, as shown in FIGURE 9.

At two places at opposite ends of the drum, and which can be at the front, as shown, or at any positions around the drum, there are provided rolling connectors, here illustrated at 126—126. These connectors are the same and only one need be described. Thus connector 126 has a supporting bracket 180 which is fastened to any suitable part of the framework of the machine, and the bracket has an insulated support for a tubular metal shell 181 in which there is slidably supported another tubular shell 182 which is spring-pressed outwardly by a spring not shown. The tube 182 has pivoted on it a small truck 183 which serves pivotally to support a pair of wheels 184. These wheels of the truck will roll neatly along the metallized surface of the graph paper 122 and the whole thing is located so as not to be engaged by the pins 120P. An electrical connection on this assembly conducts the electrical potential to the metallized area 122L, for the connector 126. Connector 127 similarly conducts potential to metallized area 122R. The two rollers of the trucks 123 of each connector 126 and 127 have a sufficient spacing so as to span the gap between the ends 122C and 122D of graph 122 and there is accordingly, no position during rotation of the drum whereat electrical potentials are not applied to this area 122R and 122L of the graph 122. An alternating form of circuitry for making connection to the graph paper, is illustrated and described with reference to FIGURES 19 and 20.

As previously described, the connectors 126 and 127 lead respectively to the terminals 130 and 131 of the winding 135 of transformer 132. Line 128 connects terminal 130 to the connector 126 and line 129 connects terminal 131 to the rolling connector 127. The winding 135 has a tap 136 which can be a midtap or a tap made adjustable to any position as desired, as perviously described. The primary winding 134 has terminals 134A and 134B which are connected to a suitable alternating current voltage supply, at a voltage and frequency which may be widely varied as previously described, or as provided in FIGURES 19 and 20, which is preferred.

In this way, when the transformer 132 is energized, an alternating potential is imposed through the rolling connectors 126 and 127 on the separated metallized areas 122L and 122R, respectively, of the graph paper 122.

The pick-up bar 140, in this embodiment of the invention is made somewhat different from that shown at 40 in FIGURE 1. Thus referring to the drawings, the bar 140 which can be of any metal but is desirably made of aluminum, can be a bar of for example ¼ to ⅜ inch thick and ½ to 1 inch in width. This bar is supported by two structural struts 185—185. Referring to FIGURES 11 and 13, it will be noted that the upper ends of the struts 185 are champfered at the surfaces 185C, and the ends of the struts are axially threaded at 185T so as to receive a cap screw 186 which extends through a fairly loose aperture 187 in the frame support 188. Above the frame support 188 there is a spring 189 which bears against the flanged head 190 of the screw 186. With the screw 186 threaded into the upper ends of the struts 185, as shown in FIGURE 13, the spring 189 will cause the uppermost end of the strut to bear at 191 against the under surface of the frame 188, but this leaves a clearance between the surface 185C and the remainder of the support, and there is accordingly produced a tipping moment 192, which tends to cause each of the struts 185 to swing in a direction which is towards the drum 120, and this causes the entire bar 140 to be gently but positively urged toward the surface of the drum 120.

The cross-sectional shape of the bar 140 is best illustrated in FIGURE 16 where it will be observed that the bar 140 has an upper surface 140U, a lower surface 140L, a back surface 140B (normally visible from the front of the machine). The front of the bar (which faces the graph) can be a flat surface, the same as back surface 140B. However, to aid in visibility, and to allow the operator to visually inspect the position of the pickup with reference to the graph line, it is preferred that the front surface be composed of chamfered faces 140CU and 140CL meeting at a narrow "flat" 140K. These chamfered faces approach each other but do not form a sharp edge, but instead leave a narrow flat face which faces the metallized surface of the graph paper 122 on the drum 120. This flat surface 140K is in effect a thin narrow face which reaches from end-to-end of the bar 140, terminating at notches 143R and 143L which are provided for clearing pins 120P. In the flat face 140K there is milled a narrow, shallow grove 141, in which there is positioned an insulated wire 142 which is the actual capacitative element equivalent to the edge 41E of strip 41 in the embodiment shown in FIGURE 1. For example, the groove 141 may have a depth of .010 inch and a width of .010 inch and in it there is placed an insulated wire 142 extending along the length of the groove. The diameter of the wire is about .090 inch not including the electrical insulation which can be quite thin. The wire 142 is covered with a thin, durable insulation. The wire is laid perfectly straight and flat in the groove and is seated in the bottom of the groove. A small amount of adhesive (insulating varnish) may be placed in the groove so as to hold the wire in place after adjustment of the wire for straightness and parallelism and accurate fitting in the bottom of a groove.

Referring to FIGURES 14 and 15 it will be noted that the bar 140 is provided at one end with the notch 143R and at the other end with a notch 143L. These notches are provided at positions along the bar so as to leave clearance of the passage of the pins 120P as the drum 120 rotates. The notches 143R and 143L thus effectively define the ends of that maximum width portion of the pickup bar 140 and the groove 141 accordingly runs onto the edge faces of the notches. Where the groove thus intersects the notch there is provided a slight radius at 141R at each end of the groove (see FIGURE 15), and the insulated wire 142 is drawn at right angles around these radii. At the right end of the bar 140, as shown in FIGURE 15, in the notch 143R there is provided a drill hole 144 through which the wire 142 passes and then continues into a much enlarged drill hole 145 which comes into the bar from the back face 140B of the bar which is the face from which the bar is viewed when looking at the machine. The hole 145 is enlarged at 145E. In this hole there is contained a spring 171 the purpose of which is to tension wire 142.

The attachment of wire 142 at the spring end is as follows: The insulation on the wire 142 is stripped off and the wire is drawn through a very small metal tube 172 which is in the center of an insulating glass button 173 which is in turn provided with a metal edge flange 174. The entire assembly 170 of tube 172, insulating button 173 and flange 174 is an integral whole, and in assemblying the wire 142, the wire is threaded through a little tube 172 and then the assembly 170 is pressed down so as to compress the spring 171, and a drop of solder is placed on the wire 142 so as to attach it to the tube 172.

At the other end, the wire 142 is anchored by being drawn through a hole 146 which intersects a transverse bore 147 which enters the bar 140 from the underside 140L. The hole 147 is adapted to fit the connector 150 of the shielded cable 151 and the connector 150, being itself of metal, acts as a shield. The insulation 151I, within the cable runs up into the hole 147, and the wire 149, which is considerable larger than the wire 142, acts as a post to which to anchor the wire 142 which is drawn across and against the wire 149 and soldered in place.

In this way the wire 142 is anchored at one end (at lead wire 149) and is held tight at the other end by the tension of spring 171. Any differences in the length of the wire 142 as compared to the length of the bar, due to changes in temperature, are thereby compensated. The entire wire 142 is insulated from the metal of the bar 140, and the wire 142, thus faces towards the metal coating on the graph paper 122 as shown in FIGURE 16, and "views" a narrow strip of such metallized coating, the effective area thus "viewed" being narrow due to the shielding effect of the very closely adjacent edges of metal of bar 140, at the face 140K. Since the distance between the face 140K and the metallized coating of the graph paper 122 can be accurately adjusted down to as little as a few thousandths of an inch, the width of the metallized coating (in the direction of rotation) which is "viewed" by the wire 142 is accordingly quite narrow.

For holding the bar 140 against movement toward the drum there is provided at each end of the bar a rolling support generally designated 160, as best shown in FIGURES 14, 16, 17 and 18. Referring to these figures the metal support 160 is a slider situated in a drill hole 161 in the end (each end) of the bar 140. This drill hole is reduced in diameter at 161R. In it is positioned a slider generally designated 160 which is bifurcated at its outer end so as to form a support for a pin 162 on which a small wheel 163 is adapted to rotate. The end of the bar 140 is slotted at 164 and a screw 165 is entered through this slot and is threaded into the shank of the slider 160 and when it is tightened down will hold the slider against movement in or out in respect to the bore hole 161. At the back end of the slider there is a portion of reduced diameter, so as to leave an annular space for the spring 166 and a screw 167 is entered through the back of the bar and is threaded into the shank of the slider 160. Assuming the screw 165 is loosened, the tendency of the spring 166 is to push the slider 160 out of its recess 161, but the limit of motion is determined by how little or how much the screw 167 is fastened into the shank of the slider. Accordingly by slightly turning the screw 167 a very fine adjustment of the position of the slider in the recess can be made, and when the adjustment is satisfactory it can be locked by tightening the screw 165. Since the roller wheel 163 faces toward the drum 120, and trades on the drum adjacent the edge of the graph it forms a limit stop which will hold the entire bar 140 at a fixed distance from the drum hence the graph paper. The tendency of the support struts 185, see FIGURES 11 and 13, is gently to urge the bar 140 towards the drum and the wheels 163 limit such motion. Since the positions of the wheels 163 relative to the bar 140 can be carefully adjusted, it is thereby possible to adjust the position of the entire bar 140 (and consequently of the wire 142 carried thereby) so that a very narrow gap of uniform dimension can be maintained between the wire 142 and the adjacent metallized surface on the graph paper 122, and this gap can be adjusted so as to be exactly the same width of gap from all positions along the width of the drum. This is desirable from the standpoint of accuracy with respect to instrument operation.

Referring now to FIGURES 19–21, in FIGURE 19 there is illustrated the revolving drum 120 having the graph paper 122 thereon which cooperates with the pickup bar 120. The drum is the same as shown in FIGURE 9, except that in FIGURE 19 there is substituted another form of connection for the wires 128 and 129 leading to the conductive surfaces 122L and 122R respectively of the metalized graph paper 122. In FIGURE 19, the drum 120 is provided with two stub shafts 221L and 221R which are insulated from the structure of the drum. A connection is made through a suitable slip ring, not illustrated, from wire 128 to the stub shaft 221L and from the wire 129 to the stub shaft 221R. Internally in respect to the drum, a further connection is made via line 128E from shaft 221L to a grommet 128F and from shaft 221R a similar connection 129E is made to 129F. Both grommets are on the insulated surface of the drum 120. The grommets 128F and 129F are situated so as to coincide with one of holes 122A on the left side and hole 122R on the right side of the graph paper, and when the graph paper is in place on the drum, suitable spring clips 128G and 129G respectively are entered into the grommets, thereby making an electrical connection from line 128 through the grommet 128F and clip 128G to the metallized surface 122L of the graph 122 and a similar connection from line 129 through grommet 129F and clip 129G to the portion 122R of the graph. Thus by providing slip ring connections to the two shafts 221L and 222R and by means of suitable internal connections within the drum and grommets and clips on the surface of the drum, a permanent connection can be made to the respective metallized surfaces on the graph, thereby replacing rollers 126 and 127.

In FIGURE 19 which is a block-wiring diagram, the signal lead wire 149 extends to the terminal 152 of an alternating current amplifier generally designated 225, which is provided with a gain adjustment. This amplifier has a suitable power supply at B+ and is grounded. The output via line 226 extends to the input terminal 227 on a demodulator generally designated 228 which converts the amplified signal to direct current signal. The demodulator 228 is phase-correlated to the input potential on lines 128–129 by means of connections extending from terminal X on line 129 and the terminal Y on line 128 back to the correspondingly numbered terminals on the demodulator. The demodulator is also provided with a ground.

The demodulator output at terminal 229 is carried through the resistor 230 to junction 231, from which a circuit extends through condenser 232 to ground and another circuit extends via resistor 234 to an adjustable tap 235 on the resistor 236. The ends of the resistor 236 are connected to terminals of batteries 237 and 238 which are wired in series, with the center point 239 of the batteries connected to ground. Accordingly, by adjusting the position of the tap 235 on the resistor 236 the voltage at tap 235 can be varied to a potential above or below ground potential. By doing this the output signal may be shifted one way or the other, in a manner which is equivalent to translating the entire graph G in one direction or the other, transversely with respect to the graph. Therefore, the adjustment at 235, in effect, shifts the "zero point" of the reference signal at the junction 231.

From junction 231 a line 240 connects to the input terminal of a DC amplifier generally designated 241 which is supplied with power terminals BB+ and BB−. The output 242 of the amplifier connects directly to one of the output terminals 243 of the device, the other output terminal 244 being connected to ground. Accordingly, between the two output terminals 243 and 244 there appears a direct current output signal, which in a commercial device, may for example, be between limits of ±5 v. D.C.

The alternating current supply for transformer 132 originates at the multivibrator oscillator generally designated 250 which is supplied with direct current potential BB+ at terminal 280. The multivibrator is likewise provided with ground. The multivibrator per se, is of standard design and is fully transistorized, and has an output terminal 251 which leads to the input terminal 252 of a standard transistorized power amplifier generally designated 254. The power amplifier has output terminals 255 and 256 which are connected to the terminals 134A and 134B, respectively, of the primary winding 134 of transformer 132.

The voltage supplied to the primary winding 134 is regulated by means of a "chart voltage regulator circuit" generally designated 263 which is follows:

From tap 130 on transformer secondary winding 135, a circuit 257 leads through the diode 258 and resistor 259 to junction 260 from which a circuit extends through resistor 261 to ground terminal 262. From junction 260, a circuit extends to junction 264 from which a circuit extends through a capacitor 265 to the ground terminal 262. The circuit then extends from the junction 264 to the input terminal 266 of an amplifier generally designated 267. This amplifier is supplied with direct current as at terminals B+ and B—, and the amplifier is adjustable for gain. The amplified output is communicated via line 268 to the regulator terminal 269 of the multivibrator oscillator. In effect, the voltage of the transformer secondary 135 is sampled at terminal 130, and this sample voltage after proper rectification, is applied to terminal 269 of the multivibrator and controls the output voltage of the multivibrator supplied at terminal 251. The frequency of alternating current voltage supplied by the multivibrator is determined by the constants of the multivibrator circuit, which is of known design utilizing solid-state circuitry. It is noted that the power amplifier is supplied with a ground terminal 253.

FIGURES 20 and 21 illustrate in greater detail the circuitry for the arrangement shown in the block diagram of FIGURE 19. Transistors and solid state electronic components are used throughout the circuitry as illustrated.

Referring to FIGURE 21 there is illustrated a power supply served by alternating current supply lines L1 and L2. Solid-state circuitry components are used. Typically, this would supply regulated output of 20 volts DC positive, at the terminal B+ and regulated 30 volt DC positive output at the terminal BB+. The power supply also provides a regulated output of 20 volts DC negative at the terminal B— and a regulated output of 30 volts DC negative at the terminal BB—. All voltages are with reference to ground potential since the power supply is grounded.

In FIGURE 20 it will be understood that the terminals X—X are connected and terminals Y—Y are connected, all as shown in FIGURE 19. Also in FIGURES 20, the voltage supply for the zero shift adjustment resistor 236 is provided from the terminals B+ and B— these being the voltages of the power supply as shown in FIGURE 21, rather than from a separate battery source as shown in FIGURE 19. Referring to FIGURE 20, the signal on line 149 is supplied to resistor 280 of the AC amplifier 225, and from a variable tap 281 on this resistor, which constitutes the "Span Adjustment" capability of the instrument already described, this signal continues through transistor 282, and thence through the remaining stages of the amplifier until it appears as an amplified alternating output signal, which is communicated to the demodulator 228, from which the demodulated output signal is communicated via resistor 230 to the terminal 231, as previously described with reference to FIGURE 19. The signal at line 240 is then communicated to the input of DC amplifier 241, from which the amplified DC output appears at line 242, and communicates to the signal output terminal 243 as previously described.

Referring again to FIGURE 20, in the multivibrator 250, there is provided terminal 280 on line 281. Power at voltage BB+ is supplied to terminal 280 and line 281 from the power supply of FIGURE 21. The line 281 is connected to terminal 134A of the primary winding 134 of transformer 132. The terminal 134B of the same winding is connected to terminal 256 of the power amplifier generally designated 254. From terminal 252 of the power amplifier, a line extends back to terminal 251 of the multivibrator. The line 281, which is supplied with power at voltage BB+ also extends into the "Chart Voltage Regulator" and is connected to the output transistor 284, which has an input line 285 and another output circuit at 286 communicating through the condenser 287 to ground, and connected via line 288 back to the transistors of the multivibrator circuit 250. As a result of the circuitry illustrated, the multivibrator is energized, and produces an alternating current output at terminal 251, which is communicated to the input terminal 252 of the power amplifier 254, and thence to the primary winding 134 of the transformer 132, and the voltage is regulated by the "Chart Voltage Regulator" 263, as the latter being supplied with a sensor voltage via line 257 which connects back to terminal 130 of transformer 132.

Referring to FIGURE 22, there is illustrated a turntable generally designated 300 which revolves on the shaft 301. On this turntable there is a flat disc, which is provided on its upper surface with a conductive coating, on which a polar coordinate diagram illustrated by the graph line GG, is drawn, thereby dividing the chart surface into a conductive coating portion 322L which is within the area bounded by the graph line GG and portion 322R which is the portion of the diagram outside of the graph line GG. AC potential is communicated via the rollers 326, to the portion 322L, and rollers 327 to the portion 322R, thereby energizing these portions with alternating current, in the same manner as the portions 122L and 122R were energized in FIGURE 8, and as elsewhere illustrated and described herein. Extending radially from the center 301, and mounted closely adjacent the conductive surface on the polar diagram 322, there is provided the pick-up bar 340 which is mounted stationary by mounting brackets, not illustrated, and provided with adjustment so that its position may be adjusted very carefully, so that to provide a spacing between the pick-up 340 and the surface of the polar diagram 322, as the latter is revolved around its center 301. The construction of the pick-up bar 340 can be similar to that shown at 140 in FIGURE 9, and it is provided with a shielded output line 350 having a conductor 349 therein which carries the signal voltage. The signal is utilized as illustrated in the wiring diagram FIGURE 20. FIGURE 22, thus illustrates an embodiment of the invention wherein a polar coordinate graph is utilized.

In FIGURE 23, there is illustrated an embodiment of the invention wherein a very long belt-type chart or a continuous long strip chart is provided so as to run on rollers 400 and 401. Where the chart is a very long chart, the roller 400 can be a supply roller and the roller 401 can be a take-up roller and these are driven by suitable drive means not shown, so as to pull the chart, generally designated 422 at a uniform rate of speed in the direction of arrow 403. Where the chart is a long belt, these rollers are simply smooth rollers for holding the belt. The path of travel that the chart is run on from roller 400 to the roller 401 is such that the chart is run partially around the intermediate roller 402, which can be made identical with that shown in FIGURES 9–12, will then serve as a rolling support for holding and propelling the chart and it will define the path of movement of the chart, thereby carefully preserving the position with reference to the pick-up 440 which can be of precisely the same type as shown at 140 in FIGURE 9. The roller wheels on the end of the pick-up 440 preserve its distance adjustment relative to the chart 422 as it moves over the roller 402. The pick-up 440 is provided with a shielded output line 450 having a conductor 449 on which the signal voltage is carried the same as in the FIGURE 9 embodiment.

The chart 422 having a graph line G divides the chart with two conductive portions 422L and 422R. These two portions are energized with input alternating current voltage excitation via the roller connectors 426 and 427 which may be similar to those shown in the FIGURE 9, embodiment.

If desired, the chart 422 can be made in the form of a belt, which revolves continuously around two rollers 400 and 401, or the chart 422 can be made in a long strip which is fed off of roller 400 and taken up on roller 401. The output signal on line 449 is communicated to suitable electronic circuitry the same and the excitation supplied the rollers 426 and 427 can be handled as shown in FIGURE 20. FIGURE 23 thus illustrates an embodiment of the invention wherein the chart configuration per se is somewhat different than that shown in the embodiment of FIGURES 1 and 9. In all three embodiments (FIGURES 1, 9 and 23) the chart is made prepared according to a rectangular system coordinates.

As it is apparent that many modifications and variations of the invention hereinbefore set forth, may be made without depearting from the spirit and scope thereof, the specific embodiments described should be considered merely as illustrative, and the invention is limited only by the terms of the appended claims.

What we claim is:

1. An apparatus for generating a voltage signal which is a function of the values, measured on a transverse which is a function of the values, measured on a transverse coordinate with reference to a datum value, of the points constituting a graph line which is plotted according to a system of coordinates having a motion coordinate and a transverse coordnitate oriented transverse to said motion coordinate comprising a graph composed of electrically conductive areas separated by a narrow non-conductive area which constitutes said graph line, means for supporting said graph for movement in the direction of said motion coordinate while maintaining at least a narrow strip of graph straight in the direction of said transverse coordinate as it moves past a pick-up location line transverse to said motion coordinate, power terminal means connected to said separated electrically conductive areas for constantly applying an alternating potential to said areas, an elongated, narrow, electrically shielded electrode supported at said pick-up location in a position parallel to the transverse coordinate and parallel to and closely adjacent to the conductive surfaces of the graph, and first and second signal terminals, the first signal terminal being connected to said electrode and the second signal terminal being connected to said power terminal means.

2. The apparatus of claim 1 further characterized in that said graph is planar.

3. The apparatus of claim 1 further characterized in that said graph is in the form of a belt which is carried by roller means, the path of said belt being past said pick-up station.

4. The apparatus of claim 1 further characterized in that said graph is in the form of a long strip and is fed from a feed roll, thence past said pick-up station to take-up roll.

5. The apparatus of claim 1 further characterized in that said graph is supported so as to form a cylindrical surface, and said motion coordinate is in a plane normal to the axis of said cylindrical surface and tangential thereto at said pick-up location line, said pick-up location line, said transverse coordinate and electrode all being parallel to the axis of said cylindrical surface.

6. The apparatus of claim 1 further characterized in that said graph is a disc and is plotted on polar coordinates, said pick-up location line, transverse coordinate and electrode being parallel to a radius of said disc and said motion coordinate is circular about the center of the disc.

7. The apparatus of claim 1 further characterized in that said graph is planar and said motion coordinate and transverse coordinates are intersecting straight lines in the plane of said graph.

8. The apparatus of claim 1 further characterized in that the electrode is mounted in electrically insulated relation in an electrically grounded shield frame which encloses the electrode except for a line or area extending lengthwise thereof and facing said graph.

9. The apparatus of claim 8 further characterized in that said shield frame is mounted so as to be movable towards said graph surface and bias means is provided for urging it towards said surface, and stop means is provided for maintaining the shield and electrode uniformly spaced from said surface throughout the length of the electrode.

10. The apparatus of claim 9 further characterized in that the stop means is adjustable for varying the spacing of the electrode from said graph surface.

11. The apparatus of claim 10 further characterized in that the stop means comprises wheels on the ends of the shield frame located so as to roll on said graph surface.

12. The apparatus of claim 10 further characterized in that said stop means comprises wheels on the ends of the shield frame said wheels being mounted for movement relative to the shield surface.

13. The apparatus of claim 1 further characterized in that said power terminal means includes a transformer winding having first and second terminals thereof connected to said separated electrically conductive areas, and a third terminal connected to one of said signal terminals.

14. The apparatus of claim 13 further characterized in that the potential of said third terminal is adjustable.

15. The apparatus of claim 13 further characterized in that the potential of said third terminal is adjustable from a voltage between the potentials of the first and second terminals to a voltage which is outside the range of voltage between the first and second terminals.

16. The apparatus of claim 13 further characterized in that the voltage supplied by the first and second terminals is regulated.

17. The apparatus of claim 1 further characterized in that said power terminal means includes a transformer having primary and secondary windings, the terminals of said secondary being connected, respectively, to said separated electrically conductive areas, the primary winding being connected to and energized by a multivibrator oscillator.

18. The apparatus of claim 17 further characterized in that voltage regulator means is connected to said primary winding and multivibrator oscillator for maintaining the output voltage thereof substantially constant.

19. The apparatus of claim 1 further characterized in that the power terminal means includes a transformer winding having first and second voltage terminals connected respectively to the separated electrically conductive areas of the graph and an intermediate terminal which is grounded and the second signal terminal is connected to adjustable grounded voltage gradient means for adjustably establishing said second signal terminal at a potential above or below ground potential.

20. The apparatus of claim 1 further characterized in that the electrode is connected through an adjustable amplifier and thence to said first signal terminal.

21. The apparatus of claim 1 further characterized in that the electrode is connected through an AC amplifier and thence through a demodulating amplifier, for providing a direct current signal the amplitude of which varies according to the displacement of the graph line from said datum vlaue.

22. The apparatus of claim 21 further characterized in that at least one of said amplifiers is adjustable for varying the gain thereof.

23. The apparatus of claim 1 further characterized in that the graph is composed of metal coated insulating sheet material and said metal coating is removed throughout the narrow non-conductive area constituting the graph line.

24. The apparatus of claim 1 further characterized in that the connections between the power terminal means and said electrically conductive areas are in the form of conductive rollers bearing respectively against said areas as they move in the direction of the motion coordinate.

25. The apparatus of claim 1 further characterized in that the graph is carried by a cylindrical drum having insulated stub shafts, and said connections between said power terminals means and said electrically conductive areas are through said shafts and thence from the shafts through detachable connectors to said electrically conductive areas.

26. The apparatus of claim 6 further characterized in that the shield frame is in the form of a metal bar having a narrow slot extending along one of its faces and said electrode is in the form of an insulated wire supported in said slot.

27. The apparatus of claim 26 further characterized in that means is provided on the bar for tensioning the wire for maintaining it straight.

28. The apparatus of claim 26 further characterized in that the wire fills the slot without any substantial clearance.

29. The apparatus of claim 26 further characterized in that an edge of the bar faces the graph surface, said edge being beveled to a V-shape presenting a flat narrow face directed towards said graph surface and the narrow slot extends lengthwise centrally along said narrow face.

30. The method of generating a function which comprises mechanically relatively moving an electrically shielded, electrically conductive, narrow, linear element corresponding in shape and orientation to a transverse coordinate of a graph relative to a graph sheet having an electrically conductive surface which is divided by the width of an electrically non-conductive graph line into two electrically conductive areas, said conductive element being maintained transverse to the graph line while it is moved in the direction of the other coordinate of the graph and while it is maintained in a plane parallel to and closely spaced from the conductive surface of the sheet, simultaneously applying alternating electrical potential from an alternating current supply line source to the electrically conductive spaced areas and utilizing as a signal the potential occurring between the conductive element and a potential source having a conductive connection to the alternating current supply line source.

31. The method of claim 30 further characterized in that the electrically conductive element is mechanically translated in the direction of the other coordinate of the graph.

32. The method of claim 30 further characterized in that the graph is plotted polar and is rotated relative to the transversely extending element.

References Cited
UNITED STATES PATENTS 2,748,487    6/1956    Zimmermann _____ 33—123

DARYL W. COOK, *Acting Primary Examiner.*

MAYNARD R. WILBUR, *Examiner.*

J. WALLACE, *Assistant Examiner.*